June 9, 1925.  K. IKEDA ET AL  1,541,147

PROCESS OF DRYING AIR

Filed June 2, 1922  2 Sheets-Sheet 1

Inventors:
Kikunae Ikeda
Hajime Isobe
Tsuruji Okazawa

June 9, 1925.

K. IKEDA ET AL 1,541,147

PROCESS OF DRYING AIR

Filed June 2, 1922

Inventors:
Kikunae Ikeda
Hajime Isobe
Tsuruji Okagawa

Patented June 9, 1925.

1,541,147

UNITED STATES PATENT OFFICE.

KIKUNAE IKEDA AND HAJIME ISOBE, OF TOKYO, AND TSURUJI OKAZAWA, OF KITA-TOSHIMA-GORI, JAPAN, ASSIGNOR TO ZAIDAN HOJIN RIKAGAKU KENKYUJO, OF KOMAGOME, HONGO-KU, TOKYO, JAPAN.

PROCESS OF DRYING AIR.

Application filed June 2, 1922. Serial No. 565,431.

*To all whom it may concern:*

Be it known that KIKUNAE IKEDA, HAJIME ISOBE, and TSURUJI OKAZAWA, subjects of the Emperor of Japan, residing at No. 16 Go-chome, Fujimi-cho, Kojimachi-ku, Tokyo, Japan, No. 47 Nezu Yayegaki-cho, Hongo-ku, Tokyo, Japan, and No. 41 Tabata, Aza, Takinogawa-machi, Kitatoshima-gori, Tokyo Prefecture, Japan, have invented certain new and useful Improvements in Processes of Drying Air, of which the following is a specification.

The invention relates to a process of drying air on a large scale and briefly consists in passing air containing aqueous vapour through a solid adsorptive agent such as fuller's earth, Florida earth, compositions of acidic clay, charcoal and similar materials which are porous and powerfully adsorptive, the agent which has lost its adsorptive power by saturation being regenerated by heating so as to drive out the moisture and then cooled down preparatory to renewed employment, thus making it possible to dry an unlimited quantity of air with the definite quantity of the adsorptive agent.

The adsorptive agents are particularly well adapted for the purpose, because they are not only extremely quick in taking up moisture from air but readily give off the adsorbed moisture when the temperature is somewhat elevated.

The object of the invention is to obtain economically a large supply of dry air for the blast of blast furnaces, for the reduction of moisture in store houses, for the regulation of humidity in factories, dwellings hospitals etc. and further for the purpose of drying materials which can not bear heating.

The invention is clearly illustrated in the accompanying drawings, in which:—

Of all the materials tried by experiments varieties of acidic clay such as Fuller's earth, Florida earth and the like were found to be the best fitted for the purpose of drying air on a large scale. The earth must first be formed in a piece of proper shape and size so as to present a large surface to a current of air but must not be of a nature to offer too much resistance to the passage of air therethrough. One of the best adsorptive agents consists of dehydrated sticks of acidic clay having uneven surfaces.

Figure 1:
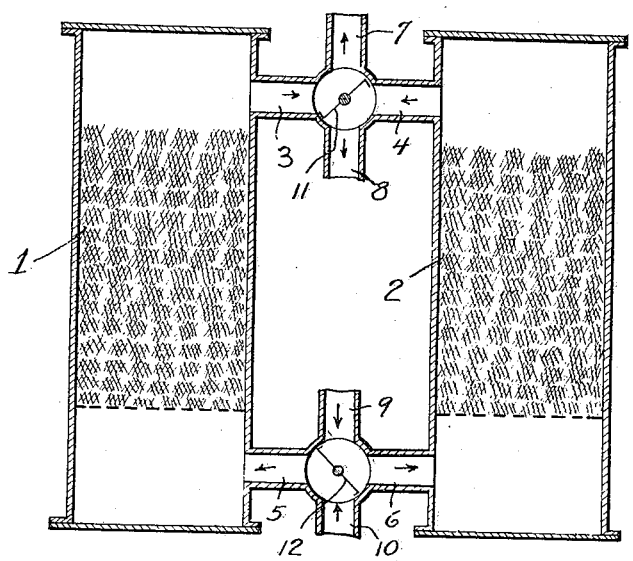
Fig. 1 is a longitudinal section of one form of the apparatus for use in connection with a blast furnace.
Figure 2:
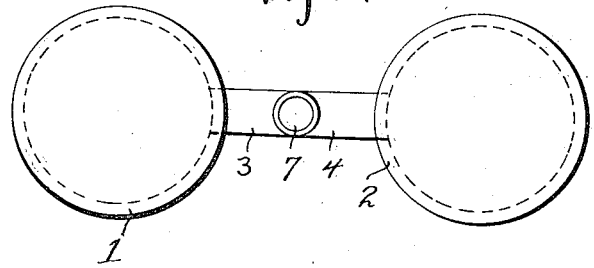
Fig. 2 is a plan view thereof.

One of the most important applications of the process is the drying of air for use in a blast furnace for the manufacture of pig iron (Figs. 1 and 2). In this case there are employed stoves for heated air and this considerably facilitates the carrying out of the process.

Towers 1 and 2 are filled with the adsorptive agent, say acidic clay properly prepared. These towers are connected to one another by upper pipes 3, 4 and lower pipes 5, 6 respectively, intersected by other pipes 7, 8 and 9, 10 while the junctures of said pipes are fitted with regulating valves or dampers 11 and 12 respectively.

The operation is carried out in the following manner, assuming the adsorbent in tower 1 is dried and that in tower 2 laden with humidity from the prior operation, atmospheric air is forced by a blower not shown, through the passages 10 and 5 into the tower 1 and is discharged deprived of its aqueous vapour through 3 and 7. From passage 7 the air passes to stoves, not shown, to be heated and to be applied as the blast. At the same time hot air at properly elevated temperature by any convenient manner, not shown, say 300° C., is passed through the passages 9 and 6 into the tower 2. The adsorbent in this tower gives out aqueous vapour to the hot air, which becomes cooler as it rises in the tower on account of the heat of evaporation of water and also as it imparts the heat of the adsorbent mass. Finally the air flows out through passages 4 and 8 quite laden with moisture and is dissipated into the atmosphere. When the air coming out from tower 2 has attained a certain temperature, say 100° C., the adsorbent in this tower has become quite dry. In the meantime the adsorptive agent in 1 has become to a great measure saturated with moisture. The clap valves 11 and 12 are reversed and the towers 1 and 2 exchange their rôle, 2 serving for desiccation of air, while 1 is being renovated. In this way a continuous supply of dry air can be maintained.

It may be thought that fresh air passed through a mass of still hot adsorbent, as it is done according to the foregoing description, will not be dried, but the contrary is the case. Fresh air coming in contact with hot adsorbent cools the lowest portion of it very rapidly, so that the adsorptive power is almost instantly recovered. As the passage of air is continued the layers above become gradually cooled and the desiccation of air is assured.

One great advantage of this process is that but little heat is lost beyond what is actually required for the evaporation of the adsorbed water.

The following numbers, based on experimental data, may serve to show the scale of the apparatus and of its working. Assuming 600 cubic meters or 20000 cubic foot per minute of dried air is wanted, the towers 1 and 2 have the capacity of 60 cubic meters each, containing 30 tons of prepared acidic clay, 600 cubic meter per minute of fresh air is passed through one of the towers, while 200 cubic meter per minute of hot air at 300° C. is passed through the other. Supposing the fresh air to contain 20 grammes of aqueous vapor in one cubic meter, the reversal of the valves is to take place at intervals of four hours. About 16 tons of water will be removed from the blast per day. When the humidity of air is less, the interval of the valve reversals is to be of longer duration and the quantity of the hot air per minute decreased accordingly.

Figure 3:
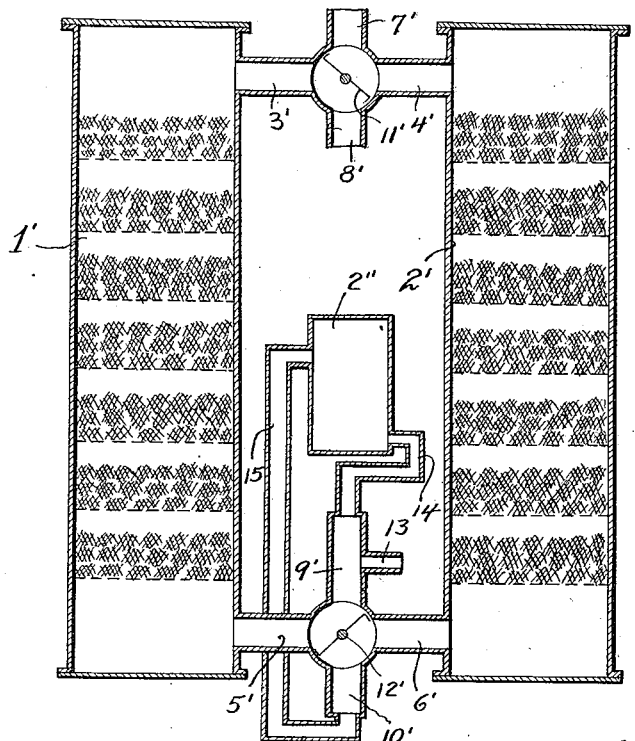
Fig. 3 is a longitudinal section of another form of apparatus for drying a store house etc.
Figure 4:
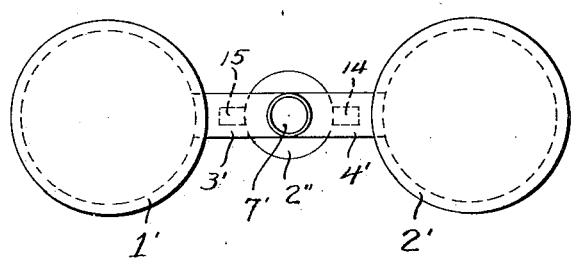
Fig. 4 is a plan view thereof.

Another important application of the process is the reduction of humidity in store houses for better preservation of goods. In this case there are usually no hot air stoves at hand, hence it is necessary to add an appropriate heater to the apparatus shown in Figs. 3 and 4 in which 1' and 2' represent towers or cylinders full of adsorptive agent, and 2'' a chamber positioned preferably between the towers in which air is heated by electric current or by burning appropriate fuel. The construction of the towers and the connections between them are substantially the same as in the form shown in Figs. 1 and 2 with the exception that the numerals for the corresponding connecting pipes and valves are primed. In addition there is provided an inlet 13 for fresh air in communication with the pipe section 9' and also communicating with the bottom of the chamber 2'' by means of a pipe 14. Another pipe 15 extends from the top of the chamber to and in communication with the pipe section 10'. It is to be noted that the position of the valves is reversed from that shown in Fig. 1 and that in consequence pipe section 8' serves as an outlet for moist air while the pipe section 7' serves as an outlet for dry air.

The mode of working is quite similar to the apparatus for supplying dry air to the blast furnace. A current of air which is driven in at passage 13 is divided into two currents, one of which passes through passages 9' and 5' into cylinder 1', where the air loses aqueous vapour and passes on to passage 3', and then is led by passage 8' into the place where dry air is required. The other current takes the direction of pipe 14 and enters the heating chamber 2'' where the air becomes heated to the requisite temperature, say 300° C. and coursing through the passages 15. 10' and 6' enters cylinder 2' where the hot air deprives the adsorbent of its moisture and passes on laden with aqueous vapour through passage 4' to the outlet 7'. When the adsorbent in cylinder 2' has become sufficiently dry, the valves 11' and 12' are reversed and cylinders 1 and 2 exchange their rôle.

This apparatus can also be employed for supplying dry air into factories, dwellings etc. or for the purpose of drying materials which can not bear elevated temperature. In such cases it may be necessary to cool the air flowing out of passage 7' because it has a temperature considerably higher than that of the environment on account of the heat of adsorption evolved by the adsorbed aqueous vapour and also on account of the heat imparted to it by the hot adsorbent. This cooling can be done quite easily at very small cost. The cool dry air so obtained can also be employed for the purpose of cooling dwelling rooms, etc. by utilizing the latent heat of evaporation of water, for in such dry air the evaporation takes place with great rapidity.

Having thus fully described the invention what is claimed and desired to be secured by Letters Patent is:—

A process for extracting aqueous vapours from air containing the same consisting in alternately treating two masses of acidic clay, contacting air carrying vapors with one of the masses of acidic clay and continuing this contacting action until the clay has absorbed substantially all of the vapors from a predetermined quantity of air and in alternately contacting an additional source of heated air with the other mass of acidic clay to remove the previous accumulation of moisture therefrom.

In testimony whereof they affix their signatures.

KIKUNAE IKEDA.
HAJIME ISOBE.
TSURUJI OKAZAWA.